April 17, 1973 A. G. GRIPARIS 3,728,157
METHOD FOR CLEANING BULK TANKS
Original Filed Sept. 30, 1968 5 Sheets-Sheet 1
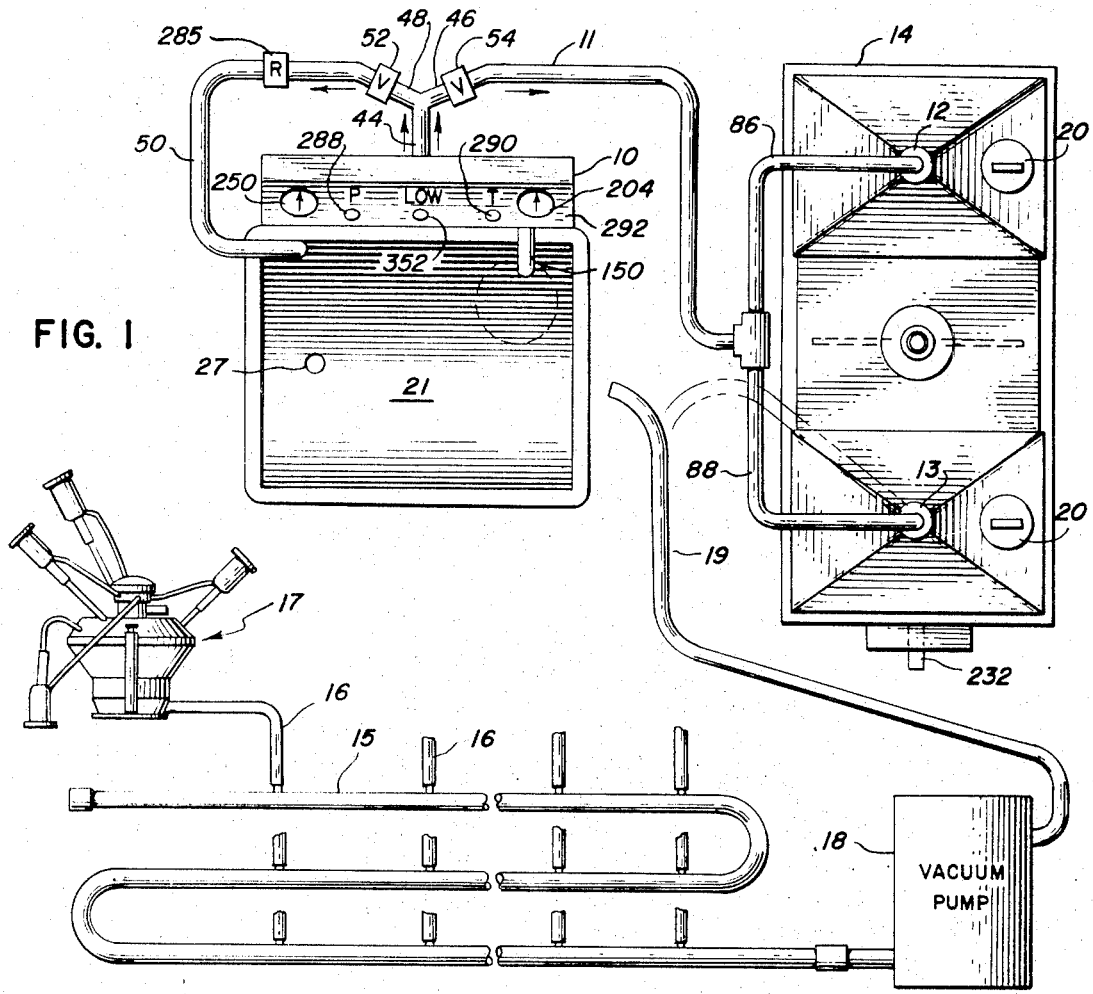
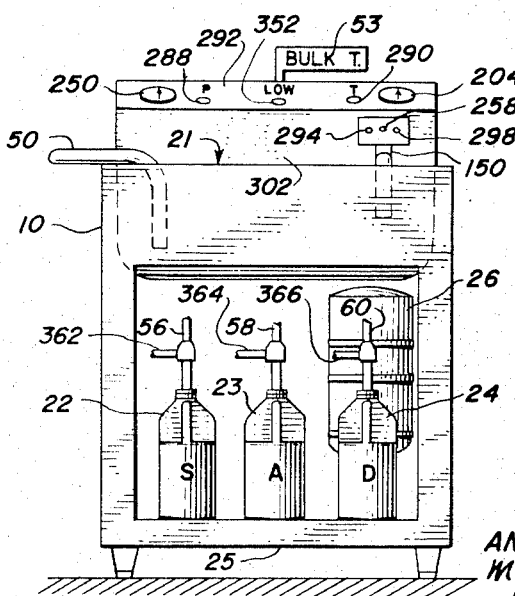
INVENTOR
ANDREW G. GRIPARIS
BY Merriam, Marshall, Shapiro & Klose
ATTORNEYS

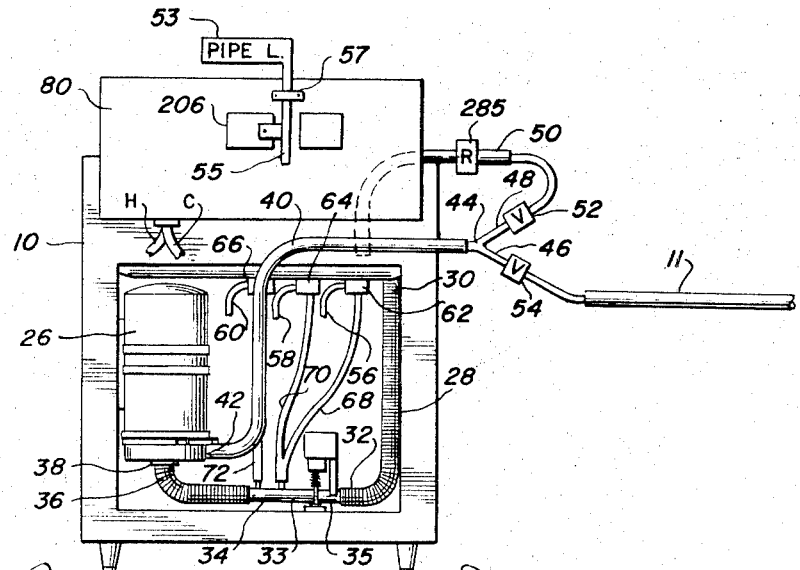
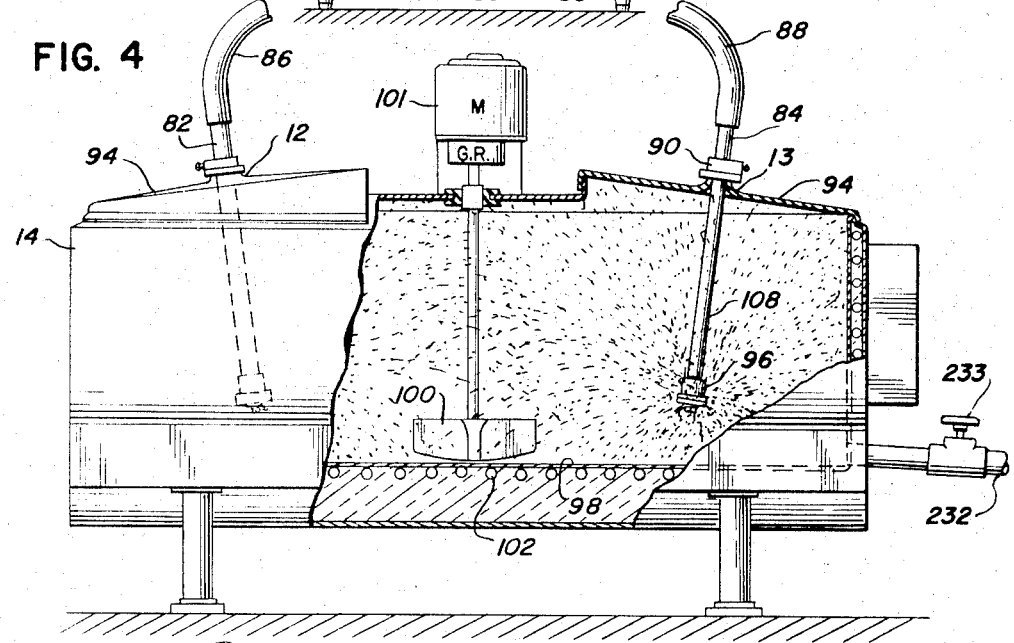
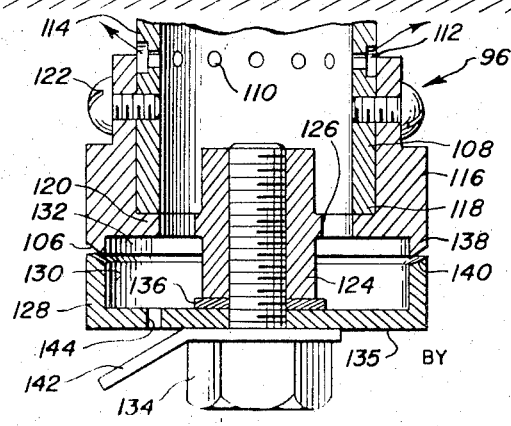

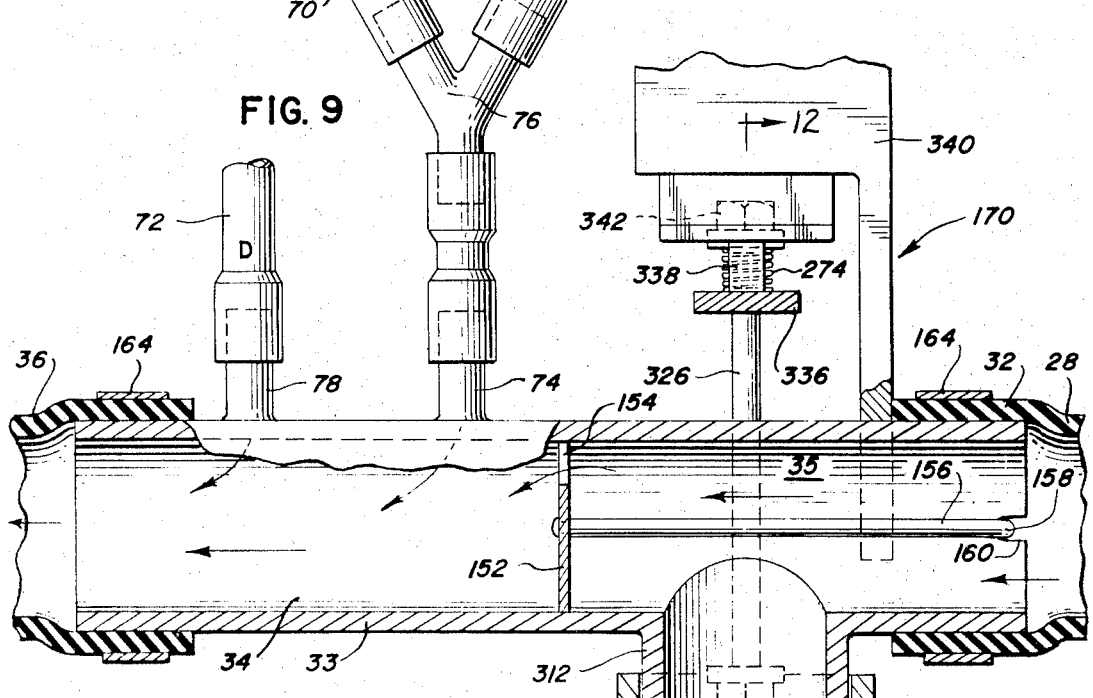

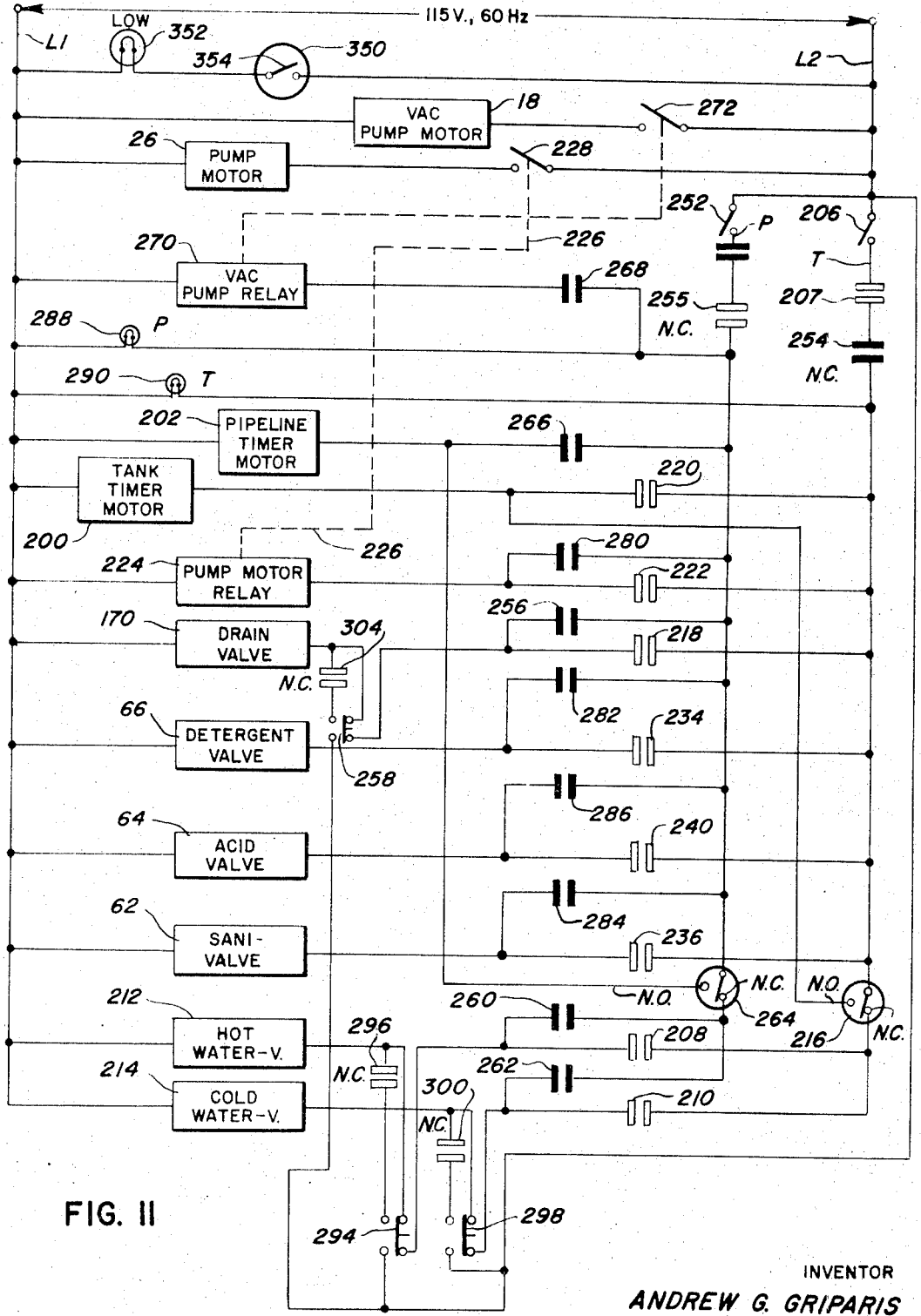
FIG. II
INVENTOR
ANDREW G. GRIPARIS

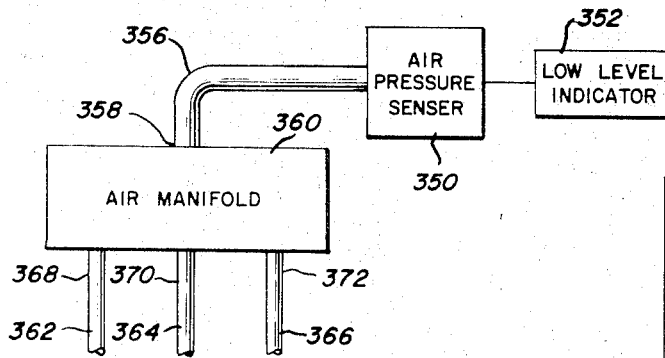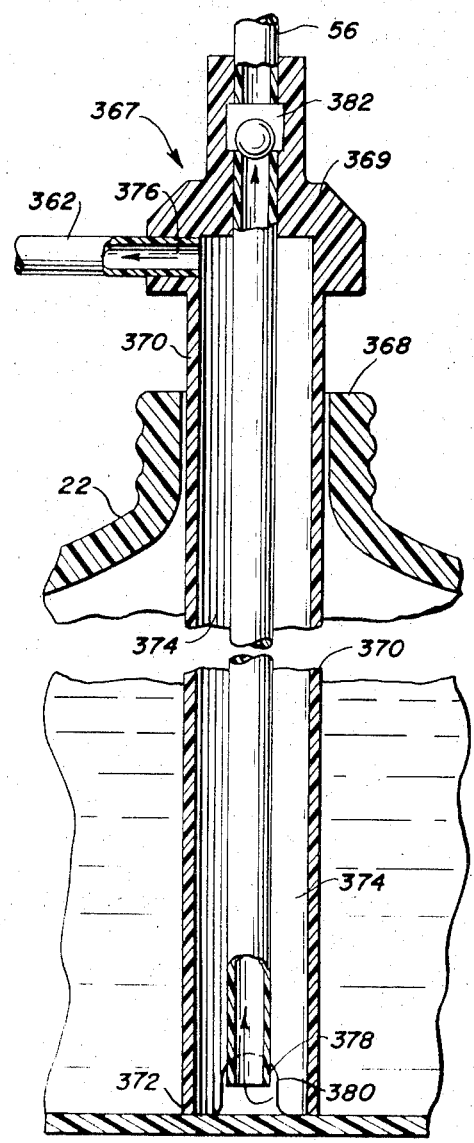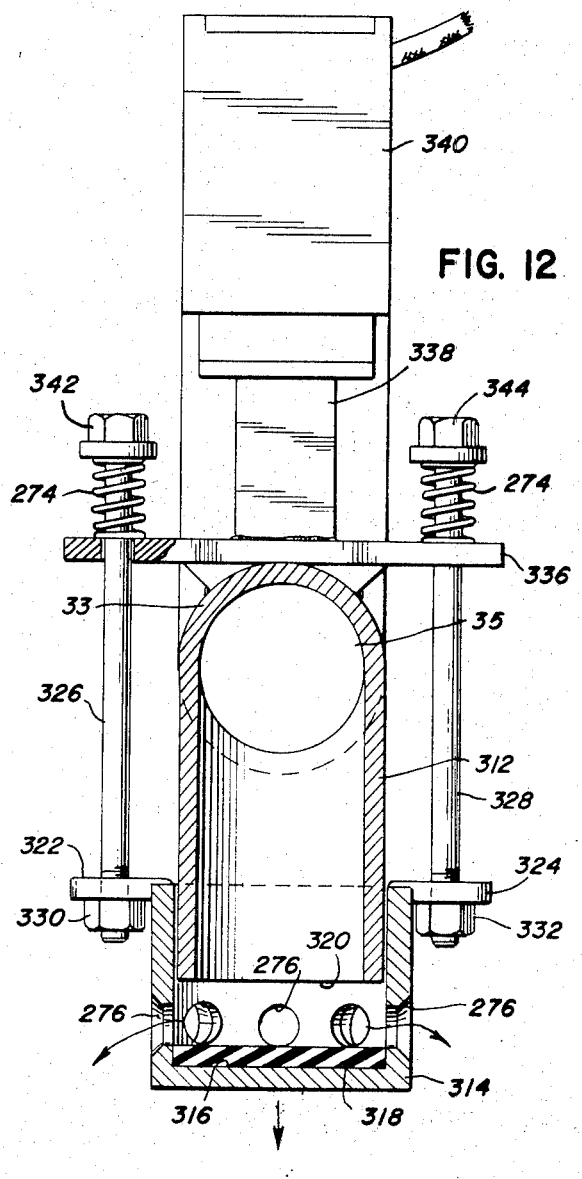

United States Patent Office 3,728,157
Patented Apr. 17, 1973

3,728,157
METHOD FOR CLEANING BULK TANKS
Andrew Geo. Griparis, Joliet, Ill., assignor to The Diversey Corporation, Chicago, Ill.
Original application Sept. 30, 1968, Ser. No. 763,823. Divided and this application June 22, 1970, Ser. No. 59,828
Int. Cl. B08b 9/08, 9/10
U.S. Cl. 134—22 R                 3 Claims

ABSTRACT OF THE DISCLOSURE

Apparatus for spray cleaning the soiled interior surfaces of a tank by alternately: (1) applying a burst of cleansing liquid through a sprayer which directs a heavy spray mist to saturate the interior tank surfaces; and (2) enabling the applied cleansing liquid to soak for a timed interval on the tank surfaces. Portions of the apparatus can be used for cleaning pipelines associated with the tank. A tank sprayer which includes an equalization chamber for equalizing the flow of liquid around the spray head and a restricted outlet at one end of the equalization chamber to form a heavy spray mist in cleaning tank interiors. A quick drain valve for rapidly draining large amounts of liquid from a conduit including a solenoid actuated seal for selectively sealing or opening a series of drain openings around the perimeter of the valve. A liquid level indicating apparatus for indicating the drop in level below a preset level of liquid in any one of a number of closed containers each having a narrow neck for filling the container, including a detector inserted through each container neck for detecting the level changes, and a single air pressure sensor responsive to the detected changes in any of the containers for indicating a low level condition.

---

This is a divisional application of a copending application, "Apparatus and Method for Cleaning Tanks and Associated Pipelines" U.S. Ser. No. 763,823, filed Sept. 30, 1968 and now abandoned.

This invention relates to the cleaning of tanks and associated equipment and in particular to apparatus and a method for cleaning soiled tank surfaces with a burst spray of a heavy mist of cleansing liquid followed by a soil digesting soak period.

The cleaning of soiled tank interiors has utilized various types of sprayers with rotating or fixed spray heads directing a heavy stream or sheet of cleansing liquid in large amounts at the top, interior sides of the tank. The liquid cascades down the sides of the tank in a steady stream preferably for more than ten minutes and is withdrawn from the tank bottom and recirculated through the sprayer so that washing or cleaning is obtained by the action of the cascading liquid eroding soil from the surfaces. Reference may be had to U.S. Pat. 3,139,100 issued June 30, 1964, to the same inventor herein for an illustration of such prior systems.

The present invention, in one aspect, is directed to a tank cleaning apparatus and method, wherein the soiled interior tank surfaces are subejected to alternating timed periods of cleansing liquid spray bursts and intermediate soil digesting intervals, with the surface cleaning obtained by surface saturation and digestion of the soil by the cleaning liquid. During a burst interval of about 40 seconds a heavy spray mist consisting mainly of droplets of cleansing liquid is applied in a layer sufficient to completely cover and saturate the soiled surface. This is followed by a soaking interval during which time the cleansing liquid penetrates the soiled surface and digests the soil. In addition to the more efficient soil digest cleaning provided by this invention, substantially less amounts of cleansing liquid are required to clean comparable surface areas than with prior systems. As an example, the previous heavy sheet spray, cascading-type tank cleaning required about 30 gallons per minute, and a total of about 45–50 gallons per cycle, whereas the present heavy spray mist, burst and soak cleaning requires approximately 10 gallons per minute and a total of about 25 gallons per cycle.

In another aspect of the invention, novel apparatus automatically cycles the cleaning operation, mixes the various cleansing liquids in the proper amount, and controls the application of the liquid required during the respective operational cleaning cycles. Furthermore, in the application of the invention to be illustrated and described in detail herein as applied to the automatic cleaning of bulk tanks used for the storage of milk in milking systems, the same apparatus can be utilized in cleaning the related pipeline equipment used in such systems and associated with the bulk tanks.

The invention will be better understood from the following detailed description thereof taken in conjunction with the accompanying drawings in which:

FIG. 1 is a plan view illustrating an example of the application of apparatus constructed in accordance with the principles of the present invention for cleaning of a bulk tank commonly used in milking systems, and which can also be utilized for cleaning the illustrated associated pipeline equipment used in such system;

FIG. 2 is a front elevational view illustrating the main apparatus cabinet housing the containers with the chemicals used in the cleaning operation, and the apparatus for automatically controlling the cleaning operation including selective dispensing of the chemicals;

FIG. 3 is a rear elevational view of the cabinet shown in FIG. 2, illustrating a pump and the piping or conduit used for delivering cleansing liquids to the bulk tank;

FIG. 4 is an elevational view partly in section illustrating the novel stationary sprayers according to one aspect of the invention in position on the bulk tank and delivering a burst of heavy mist to the tank interior;

FIG. 5 is a sectional view illustrating the construction of a spray head providing the heavy spray mist with effective omnidirectional coverage of the tank surfaces from the spray head as shown in FIG. 4;

FIG. 6 is an elevational view illustrating the spray head of FIG. 5 and the actual exits of the heavy spray mist consisting mainly of droplets from the spray head;

FIG. 7 is an elevational view illustrating an alternative embodiment of a spray head constructed in accordance with the principles of this invention to provide an omnidirectional coverage pattern of a heavy mist of droplets from the spray head towards the tank surfaces;

FIG. 8 is a sectional view illustrating the construction of the alternative spray head shown in FIG. 7;

FIG. 9 is a sectional view illustrating the chemical mixing section and the quick drain section in a conduit mounted to the cabinet as shown in FIG. 3;

FIG. 10 is a perspective view illustrating a restrictor in the conduit mixing section of FIG. 9 for properly mixing the correct chemical amounts;

FIG. 11 is a schematic diagram illustrating the timing and control apparatus controlling mixing of the cleansing liquids and operational cycling of the cleansing apparatus;

FIG. 12 is a sectional elevational view taken along the section lines XII—XII of FIG. 9 illustrating the construction details of a novel quick drain valve for selectively draining liquids in the drain section of the conduit in FIG. 9;

FIG. 13 is the schematic illustration of a novel liquid low-level sensing apparatus used for sensing and indicating a low-level condition of the chemical liquids in the apparatus of this invention; and FIG. 14 is a fragmented sectional view illustrating the construction of one of the low-level sensing detectors of this invention.

Referring now to FIG. 1 there is illustrated an overall plan view of apparatus constructed in accordance with the present invention as applied to the cleaning of tanks and the related pipeline equipment used in milking systems. The present invention is directed to an alternating burst and soak cleaning technique, and for this purpose the illustrated embodiment in FIG. 1 includes a cabinet or frame 10 housing the timing and control apparatus controlling the flow of cleansing liquids through a conduit 11 terminating in input ports 12 and 13 of the tank 14. The tank 14 is a refrigerated vessel commonly used in milking systems and is termed a bulk tank for the temporary storage of milk being directly pumped from cows. It must be understood that the application of this invention to the cleaning of a bulk tank, as will be more particularly described herein, is merely for illustration, since the principles of the invention can as well be applied to the cleaning of any type of tank, such as, vacuum tanks. FIG. 1 also illustrates the pipeline 15 and associated equipment which can also be cleaned by using the apparatus of this invention. In the usual arrangement of a milking system, the pipeline 15 traverses the milking area and interconnects a number of inlets 16 each of which connects to a suction assembly 17 strapped to each cow during milking. A vacuum pump 18 draws the milk obtained from each cow through the pipeline 15 and via conduit 19 which deposits the milk through bulk tank inputs 20 into the refrigerated bulk tank 14 for temporary storage.

The apparatus illustrated in the drawings illustrates an embodiment of this invention as applied to cleaning of the bulk tank 14 and the pipeline equipment. Referring to FIGS. 1-3, the frame or cabinet 10 supports a wash tub 21 provided for containing a measured amount of water for selective mixing with liquid chemicals maintained in individual containers 22, 23 and 24 which are supported on a base 25 of the frame. Mounted to the frame 10 is a pump 26 for pumping the water contained in wash tub 21 through a tub drain 27. A flexible pipe 28 has one end 30 suitably connected to the bottom of the tub drain 27 and another end 32 mounted to a conduit 33 containing a liquid chemical mixing section 34 and a drain section 35. A short section of flexible tubing 36 interconnects the mixing section 34 with the pump input 38.

A conduit 40 interconnects the pump output 42 with a Y divider 44—one leg 46 of which is connected to the conduit 11, and the other leg 48 is connected to a conduit 50 which empties back into the tub 21. Manually operable valves 52 and 54 are schematically illustrated as shown in FIGS. 1 and 3 in line with the conduits 50 and 11, respectively, for selectively controlling the liquid flow through these conduits. Valves 52 and 54 operate in an opposing manner so that when valve 52 is closed, valve 54 is open, such operation being obtained through the respective rotation of a function indicating lever 53 whose rotating shaft 55 controls valves 52 and 54 through means not shown in FIG. 3. As an example, the valves 52 and 54 could be provided by a ball type valve rotated by shaft 55 to open the passageway between conduit 40 and conduit 11 with the indicating lever 53 in the position shown in FIG. 2. Suitable bracket means 57 rotatingly mount the shaft 53 to the frame.

The liquid chemicals in containers 22, 23 and 24 are fed through respective flexible conduits 56, 58 and 60 through respective liquid solenoid valves 62, 64 and 66 (FIG. 3) and through respective valve output lines 68, 70 and 72 to the mixing section orifice inputs 74, 76 and 78 (FIG. 8). To avoid confusion, the front view of frame 10 as shown in FIG. 2 illustrates only the main components of the invention with the tubing being shown only in fragmented sections. Similarly, in the rear view of FIG. 3, only the main components of the invention as seen from the rear of the frame have been included in the illustration. While the physical electrical wiring and cables connecting the various components is not shown, a schematic illustration completely detailing the electrical interconnections is shown in FIG. 11. Behind the back panel 80, there is mounted the timing and control apparatus schematically shown in FIG. 10 for selectively operating the valves 62, 64, 66, the pump 26, and other apparatus to be hereinafter described.

Referring now to FIG. 4 there is illustrated a pair of sprayers 82 and 84 constructed in accordance with a specific aspect of the invention. The sprayers are respectively connected to feed conduits 86 and 88, both of which are in turn connected to conduit 11 and pump 26. Each of the sprayers is mounted with a suitable mounting assembly 90 to the respective inlet 12 or 13 in a hinged tank lid 94. The sprayers are detachably inserted into the interior of the tank 14 and terminate in a spray head 96, with the mounting assembly 90 adjusted so as to suitably position the spray head 96 between the tank lid 94 and the tank bottom 98 in accordance with the physical configuration of the tank being cleaned. It is to be understood that for cleaning of various other types of tanks using the principle of this invention, the position of the sprayer in the tank may vary from that shown in FIG. 4, and in fact in some instances only one sprayer may be needed for adequate cleaning. An agitating paddle 100 rotated by a motor 10 suitably mounted to the top of the tank 14, and the refrigerating coils 102, do not constitute any part of the present invention and are illustrated merely to indicate the standard apparatus utilized on connection with such bulk tanks. During the burst application of the cleansing liquids, it is preferred that the agitating paddle 100 be rotated so as to insure that all surfaces of the paddle are suitably cleaned.

Referring to FIGS. 5, 6 and 7, there is illustrated two embodiments of a spray head, each of which provides the heavy spray mist consisting mainly of droplets of the cleansing liquid in accordance with the principles of this invention. As shown in FIG. 4, the cleansing liquid discharged from the spray head completely fills the interior of the tank with a heavy mist of cleansing liquid droplets which are directed and also drift to the interior tank walls, such as side wall 103, so as to completely cover the entire tank surfaces with a layer sufficient to saturate the soiled surfaces. At slight distances from spray head 96, the heavy spray mist of cleansing liquid emanating from outlets on the spray head appears to have emanated in omnidirectional manner, that is, in all directions towards the tank walls to obtain complete coverage and saturation of the interior tank surfaces. In fact, by referring to FIG. 6, it can be seen that the cleansing liquid actually exits from the spray head at an upper outlet 104 and a lower outlet 106. The spray mist emanating from the upper outlet 104 is slightly lighter, with somewhat smaller droplets than the heavier spray mist emanating from the lower outlet 106 which contains somewhat larger droplets as schematically shown in FIG. 6. The heavier spray mist from outlet 106 covers the interior surfaces from approximately the top of the side walls downward to the bottom of the tank, with the majority of the spray mist issuing upwardly and outwardly from the outlet 106, and the weight of the droplets and their turbulence enabling their drifting to and complete coverage of the tank surfaces. The lighter spray mist from upper outlet 104 mainly covers the tank lids 94, other surfaces at the top of the tank, and the remainder of the top of the side walls. Leakage of the cleansing liquid at the top of the tank experienced in prior spraying systems has been significantly reduced with the spray mist application of this invention.

It is to be understood that each of the sprayers 82 and 84 and the associated spray heads are constructed in a like manner, so that the detailed description of one of the items applies as well to the other. Sprayer 84 is constructed of a metal tubular member 108, at one end of which there is provided a series of apertures 110. Circumscribed around the perimeter of the tubular member 108 and aligned with each of the apertures 110 is a recess 112 having at one end thereof a continuous series of serrations 114. A sleeve member 116 surrounds the end of the tubular member 108 with a bottom edge 118 butting against the base 120 of the sleeve 116. Screws 122 are provided for threadably engaging the sleeve 116 in the tubular member 108 so as to secure the two members together. An internally threaded stem 124 projects from the center of the base 120 outwardly from the end of the sleeve 116.

The base 120 contains a series of apertures 126 extending uniformly around the stem 124. The apertures 126 are arranged in a uniform pattern so as to enable the cleansing liquid being passed through tubular member 108 to exit from the base 120 of the sleeve 116 in a substantially uniform manner around the stem 124. An end cap 128 is provided with an internal cavity 130 having a diameter similar to that of an internal cavity 132 in the sleeve member 116 immediately below the base 120. The two cavities 130 and 132 form an equalizing chamber to obtain equal flow of the liquid to be formed into a spray mist around the spray head 96. The end cap 128 is mounted by means of a threaded nut 134 passing through an aperture in the end cap base 135 and threadably engaging the sleeve stem 124.

One or more adjusting discs 136 are placed between the end of the stem 124 and the inner base of the circular cavity 130 within end cap 128 so as to position the cap 128 with respect to the sleeve 116. This adjustment regulates the width of the circular opening 106 between the downwardly projecting edge 138 and the upwardly projecting ledge 140 of the end cap 128. As an example, with a one inch outside diameter tubular member 108, an outlet 106 opening of about 0.020 inch provides the heavy spray mist as herein defined at a pressure of about 30 p.s.i. An angled member 142 having a straight portion maintained by the threaded nut 134 against the end cap 128, and an angled portion depending downwardly therefrom is provided for deflecting a portion of the cleansing liquid exiting from an aperture 144 in the base 135 downwardly at an angle towards the rotating mixing blade 100.

Referring to FIGS. 7 and 8, there is illustrated an alternative embodiment of a spray head constructed in accordance with the principles of this invention. As illustrated therein, the spray head 95 incorporates an upper spray mist outlet 97 and a lower spray mist outlet 99. The tubular member 108 includes a continuous series of serrations 114 at one end thereof snugly engaged by an outer sleeve 101 which is mounted thereto by means of a spring biased clip 103 having one leg which passes through suitable apertures in the sleeve 101 and the tubular member 108. Within the sleeve 101 there is mounted a web member 105 having at one end thereof a spacer 107 and terminating in a threaded screw member 109. The web member 105 incorporates a series of apertures communicating with the interior portion of sleeve member 101.

An annular end plate 111 has a raised rim 113 around its perimeter and is affixed to the web member 105 by means of a washer and wing nut combination 115. The raised rim 113 provides an equalizing chamber 117 so as to obtain equal flow of the cleansing liquid passing through tubular member 108 through the sleeve member 101 and web member 105 into the chamber 117. It must be particularly noted that the inner diameter of chamber 117 is slightly larger than—approximately 0.012"—the outer diameter 119 at the end of the sleeve member 101. Extending from the outer diameter 119 on the perimeter of sleeve member 101, and toward tubular member 108, there is located a multi-angled deflector 121 which includes an infinite number of angles facing the lower liquid outlet 99. Thus, as the liquid in sprayer head 95 exits through lower outlet 99 between the inner diameter of raised rim 113 and the outer diameter 119 in substantially a vertical position towards the multi-angled deflector 121, the various incident angles on the deflector further causes the spray from outlet 99 to be broken up into a series of droplets effectively emanating from outlet 99 in various angles, as shown most clearly in FIG. 9. The multi-angled deflector 121 can be conveniently provided by helical knurling of the end of sleeve 101 with a knurling tool as commonly used for knurling operations. This knurling effectively provides an infinite number of incident angles or impingement angles of the liquid spray directed upwardly from the equalizing chamber 117. In the alternative a knurled ring can be provided as a separate unit supported on sleeve 101, with the ring free to vibrate or rotate under impingement of the liquid from lower outlet 99.

The light spray mist emanating from upper outlet 97 is directed primarily at the top surfaces of the tank and the combination of outlets 97 and 99 of spray head 95 perform in the manner of upper outlet 104 and lower outlet 106 of spray head 96 so as to obtain substantially omnidirectional coverage of the tank surfaces, similar in illustration to that shown in FIG. 4 in connection with spray head 96.

The cleansing liquid for cleaning the bulk tank 14 is obtained by selectively mixing the suitable liquid chemicals from containers 22, 23, 24 with a predetermined quantity of water contained in the tub 21. In the example set forth below, container 22 contains a sanitizing liquid, container 23 an acid, and container 24 a detergent, each of which is used during the correct operating cycle under control of the apparatus schematically shown in FIG. 11. A preset amount of water is initially furnished to the wash tub 21 through a water outlet spout 150 under control of suitable hot and cold water solenoid valves. Mixing of the liquid chemicals with the water is obtained by pumping the water through conduit 28 connected to the wash tub drain and through the mixing section 34. The respective chemical control valves 62, 64, 66 are operated to enable the desired liquid to enter the mixing section 34 through the respective orifice input ports 74, 76, 78 to mix with the water drawn by pump 26 through a restrictor disc 152 which includes an opening 154 of predetermined size to "starve" the pump and enable the correct amount of mixing of the chemicals with the water. The restrictor disc is about one and one-half inches in diameter with a one-half inch aperture. The restrictor disc 152 is mounted in the conduit 33 immediately downstream of the mixing section 34 by any suitable means such as the two elongated spring hooks 156 having a hooked end 158 engaging a recess 160 at one end of the mixing section. The conduit 33 is formed of a metal cylindrical member with respective ends engaging the flexible conduit 28 and 36 and secured thereto by suitable clamps 164. A quick drain solenoid valve 170 located in the drain section 35 of conduit 33 has a drain end 172 which is normally closed, permitting the liquid in tub 21 to pass into the mixing section 34.

Referring now to FIG. 11, there is illustrated a schematic diagram of the interconnection between the electrical and mechanical components of the timing and control apparatus of this invention. Referring to the schematic diagram of FIG. 11 and the apparatus described previously in connection with FIGS. 1–10, a more complete understanding of the operation of such apparatus as applied to the cleaning of the bulk tank 14 can be obtained.

The apparatus shown in the schematic diagram of FIG. 11 has been indicated in block-diagram form since the components thereof are standard items readily available to those skilled in the art. Cleaning of the tank is provided under control of a well known type of timer unit 200. The tank timer unit 200 is of the type which includes a series of cam contacts selectively operated in timed sequence, and for purposes of illustration, in FIG. 11 the timer cam contacts are indicated as two opposing, spaced rectangles. Since the apparatus also includes a pipeline timer unit 202, to avoid confusion, the contacts of pipeline timer 202 are indicated as somewhat more bold or heavier in the illustration of FIG. 11.

Bulk tank cleaning

In cleaning the bulk tank 14 after all of the milk has been emptied from the unit, the sprayers 82 and 84 are inserted in the openings 12 and 13 as shown in FIGS. 1 and 4 with the spray head 95 or 96 located between the top and bottom of the tank. In this example the indicated amounts of liquid were used to clean a 500 gallon bulk tank having exterior dimensions of approximately 108" long, 52" wide, and 38" high. It is to be understood that all of the contacts shown in FIG. 11 are normally open unless otherwise indicated in the drawing or the following description. The timing control apparatus of FIG. 11 operates from a standard 115 volt. 60 Hz. power source supplied between the lines L1 and L2. Initially indicating lever 53 is rotated to the bulk tank position shown in FIG. 2 to close bulk tank selector switch 206, which is mounted on the back of panel 80, and at the same time close diverter valve 52 and open diverter valve 54. This connects operating power to tank power line T and also, through the diverter valves, insures the proper pumping direction of cleansing liquids through conduit 11. The timing sequence for cleaning of the bulk tank is then initiated by the operator pulling out bulk tank timer dial 204 from the "off" to the "on" position, which closes tank switch 207. Operation of the tank timer dial also closes contacts 208 and 210, which respectively operates the hot water solenoid 212 and the cold water solenoid 214 by directly connecting the same between power line L1 through closed contact 208 and 210, respectively, and through the normally closed tank pressure switch 216. Contact 218 is also closed which operates the drain solenoid valve 170 so as to close the drain port 172.

During a level fill of the tub 21, the tub is filled with a total of five gallons hot and cold water through the hot water line H and cold water line C (FIG. 3) connected to the tub faucet 150. When the preset level of five gallons is reached, the normally closed contacts (N.C.) of tank pressure switch 216 open, shutting off the hot and cold water supply, and the normally open contacts (N.O.) close to start the tank timer motor 200. It is to be understood that the timer contacts are cam actuated in a normal manner by the timer motor to provide the correct operating sequence. Also, timer cam contacts 222 are provided to operate timer motor 200 during desired operating intervals when the pressure level switch 216 has reverted to its normal position shown in FIG. 11 due to the removal of liquid in tub 21.

The bulk tank 14 is now subjected to a timed cleaning sequence involving a prerinse period, a soil soak and digest cleaning period, a rinsing interval with clear water, and a final acid rinse interval. This operational sequence is obtained in the following manner.

During the prerinse period the bulk tank 14 is subjected to two–two and one-half gallon bursts of the water contained in tub 21 with an intermediate 30 seconds soaking period. The contacts 222 are operated to actuate the pump motor relay 224, which as shown by the dashed line 226, closes pump motor relay contact 228 thereby actuating the pump motor 26. For a timed sequence of ten seconds, approximately two and one-half gallons of the initial combined hot and cold water placed in tub 21 is drained through conduit 28 and 36 by the pump 26 and sprayed into the interior of the tank through conduit 11 and sprayers 82, 84.

As previously explained, the spray heads 95 or 96 are formed and so constructed in accordance with one aspect of this invention as to provide the heavy spray mist of droplets covering the entire interior surfaces of the tank with a greatly reduced amount of cleansing liquid and in a comparably short time. The initial ten second prerinse cycle is followed by a 30 second soaking interval during which time the contacts 222 are opened by the timer so as to deactivate the pump motor 26. This timer is followed by another ten second prerinse interval during which time the contacts 222 are again closed to operate pump 26 for applying the remaining two and one-half gallons of water in tub 21 to the tank 14 through the sprayers. The excess water which accumulates at the base 98 of the tank is drained through tank drain 232 and the open valve 233. This completes the prerinse cycle and before operating the apparatus in the cleaning cycle, the tub 21 must again be filled with a predetermined amount of water which is to be mixed with the suitable chemicals in containers 22, 23, 24.

During the filling of tub 21, the contacts 208 are operated to actuate hot water solenoid valve 212 (the normally closed contacts of pressure level switch 216 being closed) with the contacts 218 remaining closed to continue to close the drain valve 170. Approximately five gallons of hot water are passed through faucet 150 into the tub 21. After the filling period has been completed, timer motor 200 and pump 26 are again operated as previously described. Also at this time timer contacts 234 and 236 are closed to actuate the detergent solenoid valve 66 and sanitizing liquid solenoid valve 62. The detergent valve 66 controls the passage of liquid detergent from container 24 through flexible conduits 60 and 72 into the mixing section 34. Similarly, the valve 62 controls the flow of sanitizing liquid in container 22 through conduit 56 and 68 into the mixing section. For convenience of illustration, in the rear view of FIG. 2 the containers 22, 23, 24 have been respectively identified with the letters "S," "A," and "D," and in FIG. 9 the respective inputs to the mixing section 34 have been similarly identified.

The detergent maintained in container 24 is an alkaline liquid solution able to saponify the fat in the soiled interior tank surfaces and so as to quickly penetrate the soil. The detergent also contains wetting agents for conditioning the water. The sanitizing liquid in container 22 is a standard type of sodium hypochlorite solution. The remaining chemical stored on the frame 10 in container 23 is a liquid acid for neutralizing the alkalinity of the interior tank surfaces following application of the detergent. The flow of acid is controlled by the acid valve 64 operated through the bulk tank timer contacts 240.

With the tub filled with about five gallons of hot water, the active cleansing cycle is initiated. The active cleansing cycle consists of alternating intervals of application of a spray mist burst of the detergent and sanitizing liquid followed by a soaking interval during which time the detergent penetrates the surface and digests the soil. During an initial 20 second burst period, the contacts 234 and 236 are closed to operate the detergent valve 66 and the sanitize valve 62. The pump 26 is also operated during this period, thus pumping water from the tub drain through the conduit 28 and mixing section 34, and by means of the restrictor 154 mixing a predetermined amount of hot water with detergent and sanitizing liquid in mixing section 34. The restrictor 154 is arranged such that the five gallons of water in tub 21 will be drained in 20 seconds. During this time, the cleansing liquid consisting of the mixture of water, detergent supplied through orifice 78, and sanitizing liquid through orifice 74 are applied in a heavy mist through spray head 96 to form a soaking layer which completely covers and saturates the interior surfaces of the tank.

The orifices 74 and 78 are of a sufficient diameter to enable the desired amount of detergent and sanitizing liquid to mix with the water drawn through venturi 154. In this example of the invention orifices 74, 76, 78 are each formed of a threaded Teflon rod having a central aperture approximately $\frac{1}{32}$ inch. It may be noted in FIG. 9 that a short Y section is provided to enable the liquid acid to pass through sanitize liquid orifice 74 and thereby remove any mineral which tends to build up around orifice 74 due to the action of the sanitizing liquid.

This initial 20 second burst application of cleansing liquid to the surfaces is followed by a ten second soaking period during which time the tub is again filled with hot water. The short soaking interval is followed by a ten second burst of cleansing liquid during which time two and one-half gallons of water are mixed with the correct amount of detergent and sanitizing liquid through orifices 78, 74 and sprayed in a heavy mist in the tank. This is accomplished in a manner similar to that described in connection with the previous burst interval.

Following this last application of cleansing liquid to the tank, a 60 second soaking period follows, during which time the cleansing liquid is allowed to penetrate and digest the surface soil. A final application of cleansing liquid is applied during a ten second burst interval in which the remaining two and one-half gallons left in the tub are mixed with detergent and sanitizing liquid and applied to the tank. It is to be understood that during these intervals the respective timer contacts indicated in FIG. 11 are automatically operated as previously described in connection with the same respective intervals.

To initiate the following clear water rinsing period the contact 210 is closed to operate cold water valve 214 in order to fill the tub 21 with five gallons of cold water. During the clear water rinse cycle, two and one-half gallons of water are delivered through pump 26 in approximately ten seconds so as to cover the inside tank surfaces. A 30 second soaking period is followed by a second ten second burst of the remaining two and one-half gallons of clear water applied through pump 26 to the sprayers 82, 84. This completes the clear rinse cycle.

In preparation for the following acid rinse of the surfaces, the cold water solenoid valve is again operated for ten seconds to fill the wash tub with five gallons of cold water. Contacts 222 and 240 are operated to enable pump 26 to mix a suitable amount of water through restrictor 154 in the mixing section 34 with a quantity of acid furnished thereto through orifice 76. The acid rinse cycle continues for 20 seconds until the five gallons of water in the tub have been applied with the added acid to the tank. With the completion of the acid rinse, cleansing of the interior tank surfaces is accomplished.

When sanitizing of the bulk tank 14 is desired before the application of milk from pipeline 15, the bulk tank timer dial 204 is operated to the sanitize position. The cold water solenoid is operated to fill the tub 21 with five gallons of cold water, and sanitizing of the tank follows by timer actuation of contacts 222 and 236 to operate the pump and sanitizing valve respectively. The pump draws the five gallons of water through the mixing section 34 and suitably mixes a prescribed amount of sanitizing liquid through orifice 74 for application to the tank.

Pipeline cleaning

As mentioned previously, the apparatus of this invention can also be utilized to automatically clean the pipeline 15 and the associated equipment commonly used with bulk tank 14 in the milking system to which the present invention has been applied as an example. In this connection, briefly, the timing and control apparatus shown in FIG. 11 is used for selective mixing of the chemicals in the tub 21 for subsequent application to the pipeline 15 through the suction assembly 17 under the action of vacuum pump 18. The apparatus of FIG. 11 selectively fills the tub with the correct mixture of water and chemicals from containers 22, 23, 24 and also controls the operation of the vacuum pump 18 during the cleaning operation. Cleaning of the entire pipeline 15, including the suction assembly 17, must be performed after each milking operation. During cleaning, the suction cups from the suction assembly 17 are placed in suitable baskets in tub 21.

To initiate the pipeline cleaning sequence, the operator rotates the function indicating lever 53 to close contact 252 to supply voltage to the pipeline power line P, and pulls the pipeline timer dial 250 from the "off" to the "on" position. Rotation of the lever 53 to "PIPELINE" closes valve 54 and opens valve 52, thus diverting liquid in conduit 40 to conduit 50. This also opens the normally closed pipeline timer cam contact 254. It is to be noted from FIG. 11 that contact 254 is in series with the tank power line T so that opening of this contact prevents the operation of components utilized mainly in the cleaning of the tank 14. Also, note that with the tank timer dial in the "off" position, tank timer cam contacts 255 are in their normally closed position. Contacts 255 open to break the pipeline power line P when the tank timer is in the "on" position. Contacts 256 are then closed which operates the solenoid drain valve 170. Operation of the drain valve 170 is similar to the operation in the bulk tank cleaning sequence, in that actuation of the valve closes the drain end 172, with the valve remaining closed during the cleaning sequence unless otherwise indicated.

The initial pipeline timer dial operation also closes pipeline timer contacts 260 and 262 which operates the hot water valve 212 and the cold water valve 214 through the normally closed contacts of pipeline pressure level switch 264 to initiate a prerinse cycle by filling the wash tub 14 with approximately ten gallons of warm water. At the end of the filling interval, the normally open contacts of level switch 264 are closed to start the pipeline timer motor 202 and initiate the timing sequence. Contacts 268 are closed by cam actuation to operate the vacuum pump 18 through the actuating of the vacuum pump relay 270 by contacts 268 and the closing of associated relay contacts 272. During the prerinse cycle, warm water in tub 21 is drawn through suction assembly 17 by vacuum pump 18 so as to recirculate through the pipeline 15 and conduit 19 back into the tub 21. The pipeline timer motor 202 controls the prerinse recirculation of the warm water through the pipeline for a period of approximately two minutes. At the end of this time, pipeline timer contacts 268 are opened to release the vacuum pump 18 and contacts 256 are opened so as to release the drain valve 170, thus enabling the drain valve springs 274 to assist in opening the drain end 172. This allows the large quantity of water in tub 21 to be released within a very short time through drain section 35 and the drain outlet 276 as shown most clearly in FIG. 12. The specific construction of the quick drain valve 170 to be more particularly described hereinafter is another important aspect of this invention which enables rapid draining of a large quantity of liquids in tub 21.

After prerinsing the pipeline and draining the water from the tub, the apparatus is automatically placed into the active cleaning operation by timer actuation of contacts 260 to operate the hot water valve and fill the tub 14 with a quantity of hot water. When the desired amount of hot water in accordance with the length of the pipeline has been placed into the tube 21, the contacts 260 are opened. During the tub filling operation, pipeline timer contacts 256 are closed to reclose the drain end 172. In the next interval the pipeline timer motor 202 is operated so as to control automatic mixing of the detergent and sanitizing liquids with the water contained in the tub. During this mixing cycle, timer contacts 280, 282 and 284 are closed to operate the pump motor relay 224, detergent valve 66 and sanitize valve 62, respectively. The pump 26 therefore operates to drain water through conduit 28 into the mixing section 34, enabling the liquid detergent through orifice 78 and the sanitizing liquid through orifice 74 to mix with the water in the mixing section. Pump 26 draws the mixed liquids through conduits 40 and 50 into the tub 21. Thus, during this mixing time the pump 26 continuously recirculates the liquid mixture from tub 14 through mixing section 34, thus mixing the prescribed amount of detergent and sanitizing liquid with water. A restrictor 285, constructed similar to the restrictor 152 shown in FIG. 10, is mounted in the conduit line 50 leading back into the tub 21. The restrictor 285 enables the pump 26 to pump against the same head as when the pump operates into the sprayers 82, 84 during bulk tank cleaning. This provides the mixing of the same proportionate amount of chemicals and liquids when operating the equipment for bulk tank or pipeline cleaning.

During the next interval which runs approximately 15 minutes, the mixture of hot water and liquid detergent and sanitizing agent is drawn through the suction assembly 17, pipeline 15 and conduit 19 back into the tub 21 by actuation of pipeline timer contact 268 to operate the vacuum pump 18. During this approximately 15 minute interval, the liquid mixture is continuously recirculated through the pipeline. At the end of the wash period the timer contact 256 is opened to release the drain valve 170 and open the drain end 172, thereby rapidly dumping the cleansing liquid in tub 21 through (the drain opening 276 onto the floor of the milking area and thereby into a suitable drain. The draining operation occurs for about one and one-half minutes. Thereafter, the contacts 256 are again closed to close the drain, and the contacts 262 are closed to fill the tube with cold water.

Next follows an acid rinse cycle, and pump 26 is again operated to recirculate and mix the cold water with the liquid acid in container 23. Timer contacts 286 are closed so as to operate acid valve 64 and enable the pump 26 to draw acid through conduits 58 and 70, through orifices 76 and 74, and into the mixing section. Continuous recirculation and mixing of the liquids as previously described adds the required amount of acid to the water during the timed interval. In the next interval, the contacts 268 are closed to operate the vacuum pump 18 so as to circulate the acid-water mixture in the tub 21 through the pipeline. This acid-rinse cycle is timed for approximately two minutes' duration. At the completion of the acid-rinse interval, the pipeline timer contacts are all returned to their normal position, and in particular, timer safety contacts 254 return to their normally closed position. Before using the pipeline 15 for the next milking session, the pipeline must be sanitized. This is accomplished by timed sequences of the pipeline timer. The tub 21 is first filled with cold water, and the cold water is then recirculated by the pump 26 during which time the sanitize valve 62 is operated to enable a prescribed amount of sanitizing liquid to mix with the water. The mixture of water and sanitizing liquid is then circulated through the suction assemblies 17, pipeline 15 and conduit 19 by operating the vacuum pump as previously described. At the end of this time the pipeline timer returns to the off position.

Referring to FIG. 11, it can be noted that lamps 288 and 290 have been provided in the apparatus for indicating the periods of time during which the pipeline timer and the tank timer are operated, respectively. As is shown in FIG. 1, the lamps 288 and 290 are conveniently mounted to the slanting front panel 292 of the apparatus cabinet 10. Also, as is shown in FIG. 11, the apparatus includes a hot water manual override switch 294 which can be operated manually by the operator to permit hot water to flow through faucet 150 into the tub 21 according to the needs of the operator. This manual feature is under control of the bulk tank timer, including timer contact 296, which is closed when the bulk timer is returned to the off position. A similar manually operable cold water override switch 298 is provided for enabling the operator to fill the tub with cold water when desired, if the bulk tank timer dial 204 is in the off position, thus actuating normally closed timer contacts 300. As is shown in the front view of FIG. 2 of the drawings, the manual switches 294 and 298 are conveniently located on a front panel 302 immediately below the slanted panel 292. Similarly, drain valve 170 can be manually operated by the actuation of manual override switch 258, if the bulk tank timer is in the off position closing timer contacts 304.

As previously described, another aspect of this invention concerns the construction of the drain valve 170 which enables a large amount of liquid contained in the tub 21 to be drained in a relatively short period of time under control of a solenoid valve. As shown in FIG. 9, the solenoid drain valve 170 controls the flow of liquid through drain section 35 by selectively opening the drain end 172. The drain end 172 includes a hollow tubular section 312 affixed to the tubular conduit 33 so that the interior of the tube 312 communicates with the drain section 35. A slidable end cap 314 slidably engages the tubular extension 312 and contains a series of drain openings 276 placed around the perimeter of the end cap 314 as seen most conveniently in FIGS. 9 and 12. A slight recess or cavity 316 is provided between one end of the end cap and the bottom of the drain openings 276 with the cavity 316 provided between one end of the end cap and the bottom of the drain openings 276 with the cavity 316 being filled with a resilient seal member 318 for sealing of the bottom edge 320 of the perimeter around the tubular extension 312.

The end cap 314 includes two ears 322 and 324 extending outwardly therefrom including apertures through which are passed mounting bolts 326 and 328 for slidably actuating the end cap 314. One end of each of the bolts 326, 328 is threaded and is mounted to the ears 322 and 324 by respective nuts 330 and 332. A movable platform 336 is suitably mounted above the top of conduit 33 to a moving solenoid arm 338 of the drain valve 170 so that as the solenoid coil in valve housing 340 is actuated, the solenoid arm and the movable platform 336 affixed thereto are raised from the open drain position shown in FIG. 12 to the closed position shown in FIG. 9. The movable platform 336 includes a pair of apertures through which the threaded ends of bolts 326 and 328 protrude. Suitable nuts 324 and 344 threadably engage the bolts for maintaining the entire assembly in position, including the springs 274 which are mounted concentrically around the bolts 326 and 328.

In operation, when the drain valve 170 is actuated, the moving platform 336 is moved upwardly to the position shown in FIG. 9, thus sealing the drain end 172 by means of the resilient seal 318 snugly engaging the bottom edge 320 around the perimeter of the tubular extension 312. As can be seen from FIG. 9, this effectively seals off the drain openings 276 and enables liquids in conduit 28 to pass through the drain section 35 into the mixing section 34 and from there into the pump 26. When the solenoid coil of drain valve 170 is not operated, the springs 274 return to their normal position shown in FIG. 12, thus assisting in the gravity return of moving platform 336 downwardly and moving the seal 318 from the bottom edge 320. Thus, during draining, liquid entering the drain section 35 enters the hollow interior of tubular extension 312 and is drained through the drain openings 276.

As can be seen from the illustrations of the drain valve, the single resilient seal 318 controls the sealing of all of the drain openings 276 around the perimeter of the end cap 314. Thus, according to this aspect of the invention, by using one solenoid drain valve 170, the liquid is drained through a series of openings 276 all of which are controlled by the operation of a single valve. This significantly lessens the drain time required and provides a much more economical drain valve than is currently available.

In still another aspect of this invention, novel apparatus has been included for detecting a low level condition of the chemicals in any one of the chemical containers 22, 23 or 24 and indicating such condition to the operator. This prevents actuation of a cleansing operation with insufficient chemicals available. In the schematic diagram of FIG. 11, a normally open air pressure sensor 350 is serially connected with a lamp 352 across the power lines L1 and L2 for indicating a low level condition of the particular liquid in any of the containers 22, 23 or 24. The air level sensor 350 is suitably mounted behind the back panel 80 and comprises a standard, commercially available unit having a diaphragm which is actuated by changes in the air pressure to operate associated contacts. If the level of liquid chemicals in all of the containers 22, 23 and 24 is above a desired level, the contacts of the air pressure sensor 350 are normally open so that the indicating lamp 352 is not operated. If the liquid level drops below the preset level in any one of the containers, the contacts 354 in the sensor 350 are closed so as to operate the lamp 352 and thereby indicate that liquid is to be placed in one of the containers. The particular liquid chemical which is at the low level can be ascertained by examining the containers.

Referring to FIGS. 13 and 14 of the drawings, there is illustrated the apparatus utilized for detecting a drop in liquid level below the desired level in any one of the containers. In FIG. 13 a single air conduit or pipe 356 interconnects the air pressure sensor 350 and an outlet port 358 of an air manifold 360. The air manifold 360 couples input air conduits 362, 364 and 366, respectively, from the sanitizing liquid container 22, the acid liquid container 23, and the detergent liquid container 24. Air manifold 360 is constructed as a closed chamber having three inlets 368, 370 and 372 for receiving the respective air conduits 362, 364 and 366. As mentioned previously, the single outlet 358 of air manifold 360 is coupled through the conduit 356 to the air sensor 350.

Referring to FIG. 14, there is illustrated the construction of a liquid level detector 367 as used for instance with the sanitizing liquid container 22. It must be noted that the liquid level detector 367 fits within the container neck 368, and includes an outer housing 369 having a tubular extension 370 which protrudes into the container 22 with the bottom 372 of the tubular extension 370 resting on the inside base of the container. The tubular extension 370 includes a hollow interior portion 374 which communicates with the interior 376 of the air conduit 362 at one end of the hollow detector. The liquid conduit 56 passes through a centrally located passageway in the outer housing 368 and protrudes axially within the tubular section 370 to an end 378 located slightly above the base of the container and slightly above the bottom edge 372 of the tubular portion 370. An arcuate cutout 380 is located at diametrically opposed points on the outer perimeter of the tubular portion 370 with the top of the arcuate cutout 380 protruding slightly above the bottom edge 378 of the liquid conduit 56. A suitable ball-type liquid check valve 382 is located in the conduit 56 for opening and closing the conduit 56 under control of the pump 26. The check valve is required to prevent liquid in the sink from undesirably passing into the respective container before a full suction head is developed by pump 26.

In opeartion, as the liquid in container 22 is drawn by the pump 26, the liquid level within hollow portion 374 drops toward the bottom edge 372. This allows the air column within the hollow interior portion 374 between the air conduit 362 and the top surface of the liquid to drop within the hollow interior 374. When the air column in any one of the containers 22, 23 or 24 is dropped below a predetermined level, the change in air pressure is sufficient to actuate the sensor 350 and thereby operate the low level indicating lamp 352. Thus, the apparatus illustrated in the drawings permits a single air pressure sensor 350 to sense the changes in pressure in any one of three separate containers and from any one of three separate detectors each mounted in the neck of the respective container so as to present an indication of a low level in any one of the containers.

For proper operation of this pressure sensing, liquid level indicating apparatus, it has been determined that the bottom edge of the liquid conduit 56, such as the bottom edge 378, must protrude below the topmost edge of any cutouts in the tubular section 370 or protrude below the topmost edge of a tubular section 370 without cutouts. For instance, improper and erroneous indications are obtained when no cutouts or when small cutouts in the full length tubular section 370 are situated wholly below the bottommost edge 378 of the liquid conduit 56. The erroneous indications are believed to be due to a sensing of pressure changes within the outer section 370 caused by suction of the liquid up through the liquid conduit 56. Thus, instead of the cutout 380 indicated in FIG. 14 in which the topmost edge of the arcuate cutout protrudes above the bottom edge 378, an alternative would be to allow the liquid conduit 56 to protrude beyond the bottom of the outer section 370. This would enable the changing column in outer section 370 to reflect changes in liquid level rather than erroneously sensing the drawing of liquid through liquid conduit 56. In accordance with this teaching, other embodiments of this aspect of the invention can be provided, such as incorporating a ring of apertures around the perimeter of the outer section 370 at the location of the bottommost edge 378 of the liquid conduit 56.

It is to be understood that instead of the lamp indicator 352, other types of indicators can also be utilized. For instance, movement of the diaphragm in the air pressure sensor 350 can actuate suitable contacts for operating an audible alarm so as to alert the operator who may not be in position to view the lamp.

It is also within the scope of this invention to provide alternate arrangements for mixing of the liquid chemicals used during the cleaning operations. For instance, a separate pump or pumps can be added to pump any or all of the liquids to the mixing section simultaneously with the drawing of water from tub 21 through pipes 28 and 36 by pump 26. As another alternative, mixing can be accomplished in the same manner as in pipeline cleaning. That is, the tub 21 can be filled with the desired amount of water and an admixture of water and chemicals obtained by recirculation through pipes 28, 36, 40, 50 and tub 21, while adding the liquid chemicals in mixing section 34. A separate pump or pumps can also be added in this instance for pumping any or all of the liquids to the mixing section.

Therefore, the foregoing detailed description has been given for clearness of understanding only, and no unnecessary limitations should be understood therefrom, as modifications will be obvious to those skilled in the art.

What is claimed is:

1. The method of cleaning fatty soil from the interior surfaces of milk storage tanks in a timed cleaning sequence comprising:
   inserting a spray head into said tank for providing a heavy spray mist consisting mainly of droplets to the interior of said tank;
   prerinsing said interior tank surfaces during a timed interval substantially sufficient only to thoroughly wet said fatty soil by alternately,
      (1) applying a heavy spray mist burst of uncontaminated prerinsing liquid through said spray head directed substantially uniformly to said surfaces; and
      (2) allowing said applied burst of uncontaminated prerinsing liquid to soak the fatty soil while concurrently allowing any prerinsing liquid which has accumulated in the bottom of said tank to freely drain therefrom;
   washing said interior tank surfaces with uncontaminated cleansing liquid applied in repeated bursts during a timed interval substantially sufficient only to thoroughly soak and digest said fatty soil by alternately,
      (1) applying a heavy spray mist burst of uncontaminated cleansing liquid through said spray head directed substantially uniformly to said surfaces; and (2) allowing said applied burst of uncontaminated cleansing liquid to soak and digest the fatty soil while concurrently allowing any cleansing liquid which has accumulated in the bottom of said tank to freely drain therefrom; and rinsing said interior tank surfaces with uncontaminated rinsing liquid applied in repeated bursts during a timed interval substantially sufficient only to thoroughly soak and remove the digested fatty soil by alternately, (1) applying a heavy spray mist burst of uncontaminated rinsing liquid through said spray head directed substantially uniformly to said surface; and (2) allowing said applied burst of uncontaminated rinsing liquid to soak said digested fatty soil while concurrently allowing any rinsing liquid which has accumulated in the bottom of said tank to freely drain therefrom.

2. The method of claim 1, wherein said cleansing liquid is an alkaline cleansing liquid and further including the step of applying a heavy spray mist burst of a liquid acid admixture to the interior of said tank following the last rinsing for neutralizing said tank surfaces.

3. The method of cleaning fatty soil from the interior surfaces of milk storage tanks comprising:

inserting a spray head into said tank for providing a heavy spray mist consisting mainly of droplets and directed substantially uniformly to the interior surfaces of said tank;

applying a heavy spray mist burst of prerinsing liquid through said spray head substantially sufficient only to wet the fatty soil on said tank interior surfaces;

allowing said applied burst of prerinsing liquid to soak the fatty soil on said tank surfaces while concurrently allowing any prerinsing liquid which has accumulated in the bottom of said tank to freely drain therefrom;

applying a heavy spray mist burst of uncontaminated cleaning liquid through said spray head substantially sufficient only to cover and saturate the soiled top, sides and bottom interior surfaces with said uncontaminated cleansing liquid;

allowing said applied burst of uncontaminated cleansing liquid to soak on said surfaces sufficiently to digest at least a portion of said soil during a first soil soak and digest interval while concurrently allowing any cleansing liquid which has accumulated in the bottom of said tank to freely drain therefrom;

following said first soak and digest interval applying a heavy spray mist burst of uncontaminated cleansing liquid through said spray head substantially sufficient only to again cover and saturate said soiled interior tank surfaces with uncontaminated cleansing liquid;

allowing said applied burst of uncontaminated cleansing liquid to soak on said surfaces sufficiently to digest the remaining portion of said soil during a second soil soak and digest interval while concurrently allowing any cleansing liquid which has accumulated in the bottom of said tank to freely drain therefrom;

following said second soak and digest interval applying a heavy spray mist burst of rinsing liquid through said spray head;

allowing said applied burst of rinsing liquid to soak the digested soil on said surfaces while concurrently allowing any rinsing liquid which has accumulated in the bottom of said tank to freely drain therefrom; and subsequently applying a final heavy spray mist burst of rinsing liquid through said spray head to rinse said surfaces and remove said digested soil from said tank while concurrently allowing any rinsing liquid which has accumulated in the bottom of said tank to freely drain therefrom.

References Cited

UNITED STATES PATENTS

| | | | |
|---|---|---|---|
| 3,436,263 | 4/1969 | Strenkert et al. | 134—22 |
| 3,448,745 | 6/1969 | Seeley | 134—101 |
| 2,081,339 | 5/1937 | Rue et al. | 134—168 R |
| 2,424,049 | 7/1947 | Parker et al. | 134—22 R |
| 2,525,978 | 10/1950 | Vallerie | 134—22 R |
| 2,937,112 | 5/1960 | Boyer | 134—40 |
| 3,104,672 | 9/1963 | Holdren | 134—168 R |
| 3,139,100 | 6/1964 | Griparis | 134—169 R |
| 3,236,248 | 2/1966 | Ray | 134—168 R |
| 3,266,934 | 8/1966 | Alexander | 134—22 R |
| 3,281,269 | 10/1966 | Watts | 134—22 R |

BARRY S. RICHMAN, Primary Examiner

U.S. Cl. X.R.

134—22 C, 40